(12) United States Patent
Aubin et al.

(10) Patent No.: US 6,196,775 B1
(45) Date of Patent: Mar. 6, 2001

(54) APPARATUS FOR EXTRACTING CHIPS FROM SLOTS CUT INTO A SUBSTRATE

(75) Inventors: Paul D. Aubin, Bolton; Wolfgang M. Strobel, Tolland, both of CT (US)

(73) Assignee: Gerber Scientific Products, Inc., Manchester, CT (US)

( * ) Notice: Subject to any disclaimer, the term of this patent is extended or adjusted under 35 U.S.C. 154(b) by 0 days.

(21) Appl. No.: 09/317,583

(22) Filed: May 24, 1999

(51) Int. Cl.[7] .......................... B23Q 11/00; B23C 11/00; B27G 19/00
(52) U.S. Cl. ....................... 409/137; 15/339; 15/415.1; 83/98; 83/100; 144/135.2; 144/252.1
(58) Field of Search ..................... 15/339, 415.1; 83/98, 61, 100, 169; 144/134.1, 135.2, 136.1, 252.1, 252.2; 408/67; 409/131, 136, 137; 451/357, 359, 441, 451, 456

(56) References Cited

U.S. PATENT DOCUMENTS

| 4,011,792 | * | 3/1977 | Davis ..................................... 409/137 |
| 4,037,982 | * | 7/1977 | Clement ................................. 409/137 |
| 4,742,855 | * | 5/1988 | Hartley ................................. 144/252.1 |
| 4,778,315 | * | 10/1988 | Duffy et al. ........................... 409/136 |
| 4,915,550 | * | 4/1990 | Arai et al. ............................... 409/137 |
| 4,946,322 | * | 8/1990 | Colligan ................................. 409/137 |
| 4,986,703 | * | 1/1991 | Hampl et al. .......................... 409/137 |
| 5,100,270 | * | 3/1992 | Dowdle et al. .................... 144/252.1 |
| 5,332,343 | * | 7/1994 | Watanabe et al. ..................... 409/137 |
| 5,429,162 | * | 7/1995 | Bonnett .............................. 144/251.1 |
| 5,544,986 | * | 8/1996 | Kudo et al. ............................ 409/137 |
| 5,662,440 | * | 9/1997 | Kikuchi et al. ....................... 409/137 |
| 5,779,402 | * | 7/1998 | Kamedal ............................... 409/137 |

\* cited by examiner

*Primary Examiner*—W. Donald Bray
(74) *Attorney, Agent, or Firm*—McCormick, Paulding & Huber LLP

(57) ABSTRACT

In an apparatus for extracting chips from slots cut into a substrate, a cutter having a cutting implement is mounted thereon and is adapted to cut slots into the substrate. At least one injector is positioned proximate to the cutting implement, and includes a nozzle having a nozzle tip directed at the slots such that during operation a current of gas is directed into the slots to loosen any substrate chips therefrom which were generated during the cutting operation. A vacuum apparatus is positioned proximate to the cutting apparatus for capturing and removing the substrate chips loosened by the injector.

10 Claims, 3 Drawing Sheets

APPARATUS FOR EXTRACTING CHIPS FROM SLOTS CUT INTO A SUBSTRATE

FIELD OF THE INVENTION

The present invention relates generally to the machining of substrate materials such as plywood or other materials, and is more specifically directed to extracting chips from narrow slots during the machining thereof.

BACKGROUND OF THE INVENTION

The present invention finds utility in several different machining processes such as drilling or sawing wood or other substrates, and finds particular utility in the manufacture of die boards. Accordingly, and for convenience, the present invention will be described herein as being directed to such use.

Die boards are generally used to cut and/or crease one or more layers of sheet-type work material, such as cardboard, for use in the manufacture of various different articles. One such use, given here by way of example and not to be construed as limiting the present invention, is the fabrication of box and package blanks which after having been cut and creased by the die board, can be folded into finished boxes or product packages.

Usually, the die board consists of a base made from a thick piece of material such as plywood, that has a series of slots cut into it. These slots are arranged in a pattern corresponding, for example, to the outer periphery of a box or package blank, and the lines along which the blank must be folded to create the finished box or package. Rules, which generally consist of pieces of steel cut to lengths and/or bent to correspond to the slot length and configurations in the base, are then inserted into and protrude from the slots. The amount by which a particular rule extends from the slot depends on whether the rule will be employed to cut or crease the sheet material. Generally, during a cutting and creasing operation, the sheet material is positioned under the die board and pressure is applied to the board via a press, causing the rules to engage the sheet material, thereby cutting and creasing the sheet material.

In known methods of fabricating die boards, difficulties are often associated with the formation of the slots that must be cut into the die board base to accommodate the rules. Typically these slots are cut into the base in one of two ways; (1) using lasers, or (2) using a jig or band saw. The capital cost of a laser is generally very high, in addition, the use of lasers tends to be expensive and complex. A large amount of power is required to operate the laser, and the beam must typically be shielded using an inert gas. Another difficulty associated with using lasers is that the slots produced tend to have scalloped edges. When the rules are inserted into these slots, rather than having line contact between the slot edges and the rules; the rules engage the slot edges at discreet points corresponding to the "peaks" of the scalloped edge. This reduces the stability of the rule in the die-board, increasing the potential for inaccurate cutting and creasing when the die board is used. This problem is further exacerbated due to the fact that the heat associated with the laser tends to dry out the board resulting in dimensional distortion of the slots being cut and warping of the board. A further problem also attributable to the heat of the laser is that smoke is generated from the material being cut. The smoke causes environmental problems which must be addressed, resulting in further increases in operating expense.

When a jig or band saw is employed, a starting hole must be drilled at one end of the slot to facilitate insertion of the blade associated with the saw. This requires an additional operation, thereby adding to the cost associated with fabricating the die board. Furthermore, these slots are often cut by hand with the inaccuracies resulting from human error making it difficult to insert the die board rules into the slots. The potential human error can also result in inaccurate die cutting.

To address the above-described problems and difficulties, it has been proposed to employ rotary-type cutting tools such as router bits to cut the slots referred to by those skilled in the art as kerfs, into the die board. However, a potential problem associated with the use of rotary cutting tools is that the cutting process tends to generate a large amount of chips which must be removed from the kerfs. Since the kerfs are often 0.030 inches wide or less, the chips tend to lodge therein and are difficult to remove.

Based on the foregoing, it is the general object of the present invention to provide an apparatus that removes chips generated from a machining process from the slots or kerfs cut into the die board.

SUMMARY OF THE INVENTION

The present invention is directed to an apparatus for extracting chips from slots cut into a substrate including, a cutter having a cutting implement mounted therein for cutting slots into the substrate. Injection means are also provided and are positioned proximate to the cutting implement to selectively direct a current of gas, preferably pressurized air, into the slots, while the cutter is operating. During a cutting operation, the injection means causes the chips generated by the cutting implement to be loosened from the slots. Vacuum means are also provided and positioned proximate to the cutting implement, to capture the chips loosened by the injection means. Pressurizing means supply the current of gas to the injection means so that the removal of the chips generated during a cutting operation can be facilitated.

In the preferred embodiment of the present invention, the injection means includes a body member coupled to the cutter and having at least one nozzle in gaseous communication with the pressurizing means. The nozzle is movable between an extended position where the nozzle tip is adjacent and directed at the slot being cut, and a retracted position wherein the nozzle is spaced away from the cutting implement. The nozzle is retractable to allow for the use of larger diameter cutting tools and to protect the nozzle from damage.

Preferably, the body member includes a first upper surface, and a second lower surface approximately parallel to the first upper surface. The second lower surface having at least one channel formed therein and extending at least part way across the second lower surface. A piston is slidably positioned in the channel and includes a mounting surface to which the nozzle is coupled, and an opposing pressure surface approximately perpendicular to the body member and having a bore extending therefrom and in communication with the nozzle. During operation, when gas is supplied to the channel, the gas impinges on the pressure surface causing the nozzle to move from the retracted to the extended position. The pressurized gas also flows through the bore and out of the nozzle, into the slot being cut.

Preferably, a first cover is mounted to, and coacts with the body member to define at least one vacuum plenum. A vacuum source draws the chips loosened by the nozzle through the vacuum plenum and away from the slot being cut. It is also preferable that the body member define a plurality of channels, each having a piston and nozzle located therein. In addition, the body member includes a groove formed in the first upper surface and a plurality apertures, each extending from the groove, into one of the channels. A second cover overlies the groove, such that the groove and the second cover coact to define a flow path for the gas, from the pressurizing means to each of the channels.

DETAILED DESCRIPTION OF THE PREFERRED EMBODIMENT

Figure 1:
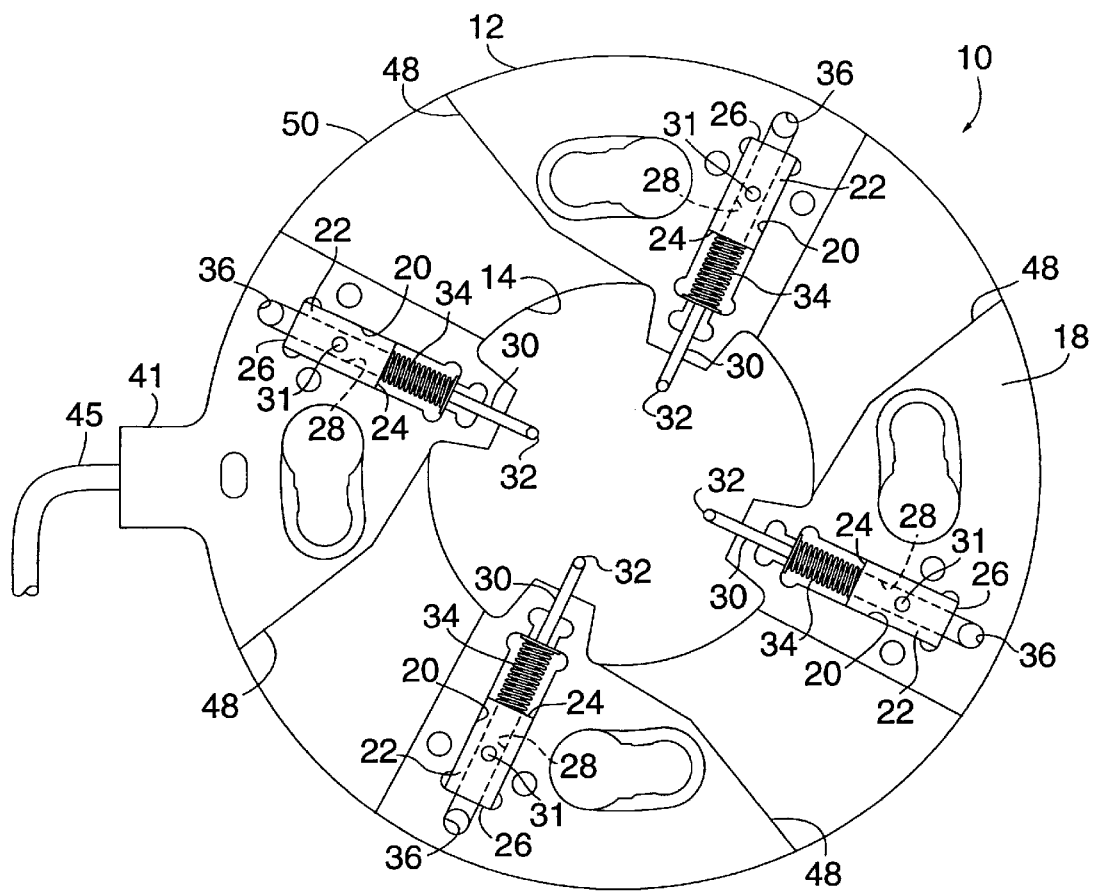
FIG. 1 is a partial view looking from the bottom, of the apparatus for extracting chips from slots cut into a substrate of the present invention.

As shown in FIG. 1, an apparatus for extracting chips from slots cut into a substrate in accordance with the present invention is generally designated by the reference number 10. The apparatus includes a cylindrical body member 12 defining a central bore 14 and a first upper surface 16, best seen in FIG. 2, and a second lower surface 18, FIG. 1, approximately parallel to and opposite the first upper surface. Four channels 20, are defined by the body member 12, each channel extending at least part way across the second lower surface 18. A piston 22 is slidably positioned in each of the channels 20 and as explained in detail below, is movable between an extended and a retracted position. Each piston includes a mounting surface 24 and a pressure surface 26 approximately perpendicular to the body member. A bore 28 (shown in dotted lines) extends through each piston 22 from the pressure surface 26, to the mounting surface 24.

A nozzle 30 is positioned in each of the bores 28 and secured therein by a set screw 31. Each nozzle 30 projects outwardly from each piston 22 into the bore 14 defined by the body member 12 and includes a nozzle tip 32. A biasing member 34 shown in the illustrated embodiment as a coil spring is positioned in each channel 20 for urging the piston 22 located therein from the extended to the retracted position. In addition, each channel 20 includes an aperture 36 extending through the body member 12 from the first upper surface 16.

Figure 2:
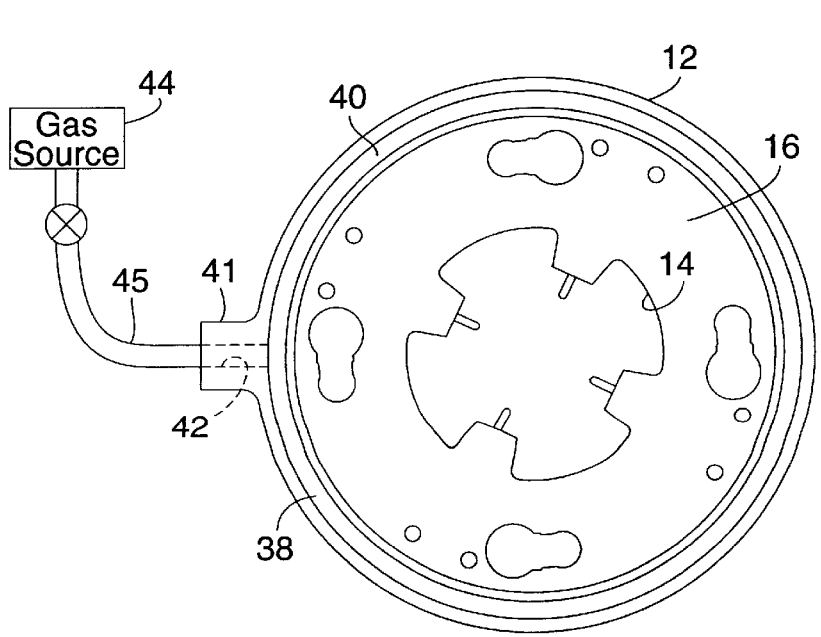
FIG. 2 is a partially schematic plan view of the apparatus of FIG. 1.

As shown in FIG. 2, a circular groove 38 is defined by the body member and extends from the first upper surface 16, partly therethrough. Each of the apertures 36, FIG. 1, is located within the groove 38, and a cover 40 overlies the groove and is attached to the first upper surface 16 of the body member 12. The body member 12 includes a boss 41 projecting outwardly therefrom and includes a bore 42 (shown in dotted lines) extending from the boss into the grove 38. A gas source 44 is in communication with the bore 42 via conduit 45. Accordingly, the cover 40 and the groove 38 coact to define a flow path for feeding gas from the gas source 44 through the apertures 36 and into the channels 20 where the gas impinges upon the pressure surfaces 26 of the pistons 22, thereby causing the pistons to move from the retracted to the extended position.

Figure 3:
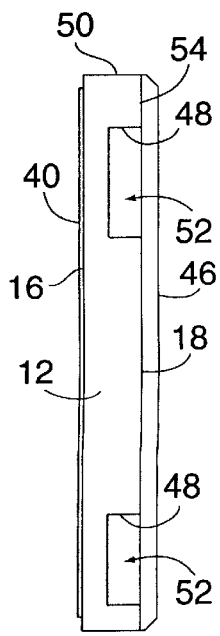
FIG. 3 is a side elevational view of the apparatus of FIG. 1 showing the vacuum plenums formed by the body member and the cover.

As shown in FIG. 3, a cover 46 is mounted to the second lower surface 18 of the body member 12. In addition, the second lower surface 18 of the body member 12 includes a plurality of vacuum channels 48 extending from the central bore 14, to a peripheral surface 50. The vacuum channels 48 and the cover 46 coact to define a plurality of vacuum plenums 52. During operation, a vacuum source (not shown) draws vacuum through the plenums 52 to capture chips loosened by the nozzles 30 and then draws the chips into a shroud and away from the machine. An elastomeric gasket 54, the function of which will be explained below is positioned between the cover 46 and the body member 12.

Figure 4:
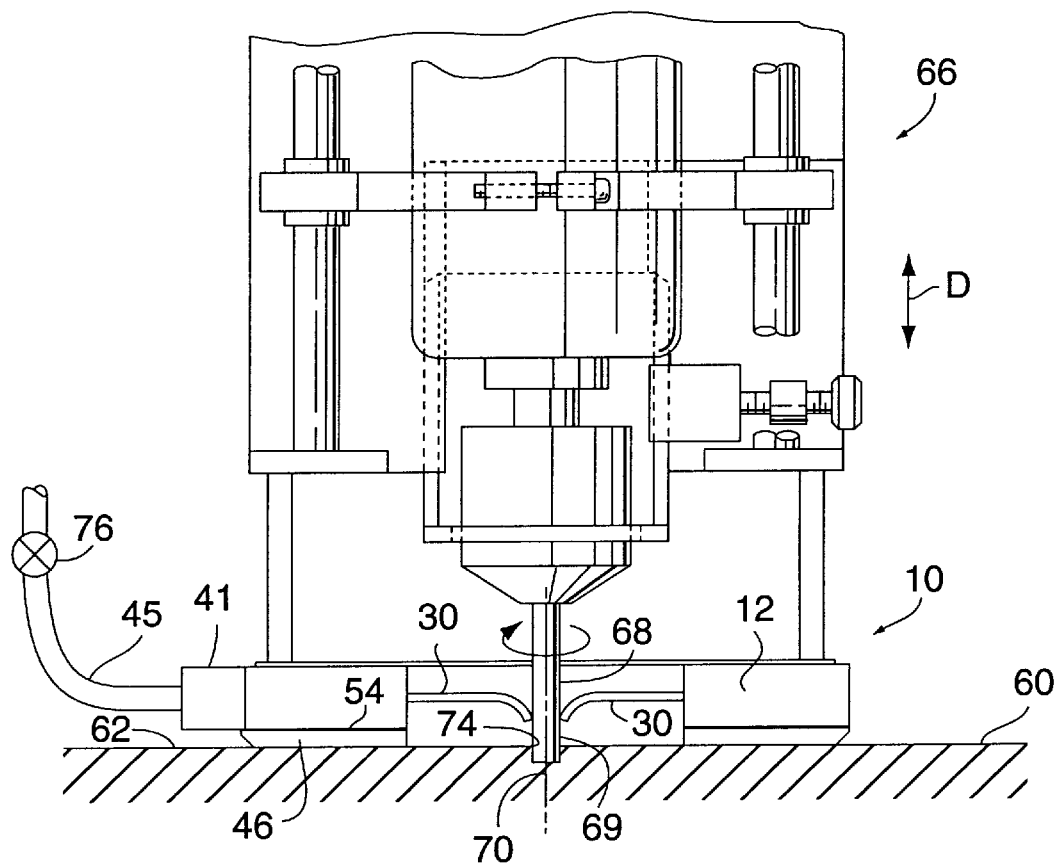
FIG. 4 is a partial side elevational view of a flat bed router having the apparatus of FIGS. 1 and 2 mounted thereon.
Figure 5:
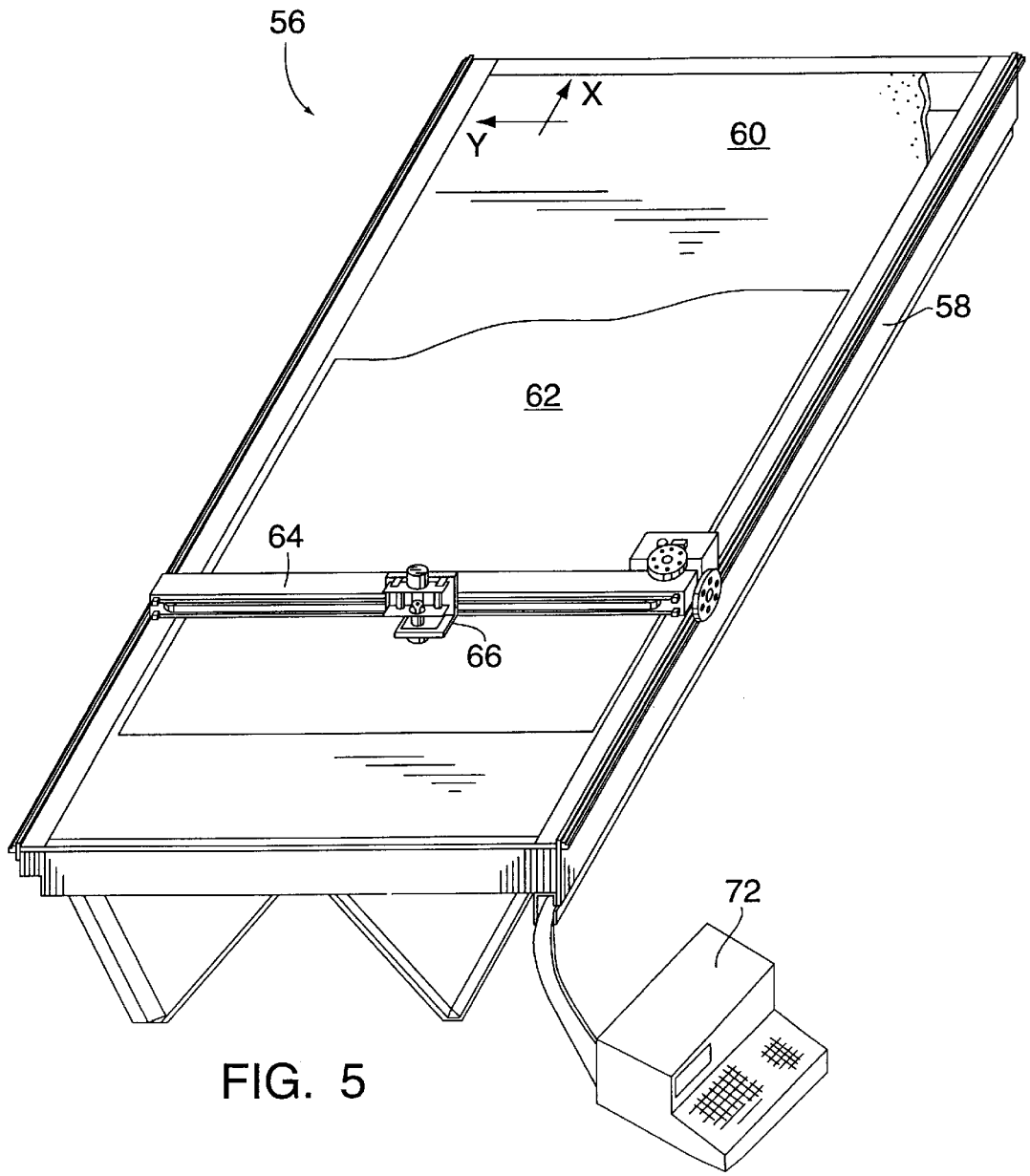
FIG. 5 is a partial perspective view of the apparatus of FIG. 3.

As shown in FIGS. 4 and 5 the apparatus 10 is mounted to a flat bed type router generally designated by the reference number 56. The router 56 includes a frame 58 having a support surface 60 attached thereto for carrying a substrate 62. A cutter carriage 64 is mounted to the frame and is movable back-and-forth relative thereto in a first direction longitudinal of the support surface as indicated by the arrow labeled X. A cutter 66 is mounted to the cutter carriage 64 for movement back-and-forth along the cutter carriage in a second direction indicated by the arrow labeled Y and approximately perpendicular to the first direction.

A cutting implement 68 shown in the illustrated embodiment as a router bit defining a rotary cutting surface 69 is mounted for rotation about a central axis 70 to the cutter 66 and movable relative to the substrate 62 as indicated by the arrow labeled A, between a working position wherein the bit engages and cuts the substrate, and a non-working position wherein the bit is disengaged from the substrate. A controller 72 is associated with the router 56 for issuing commands thereto to coordinate the movement of the cutter carriage 64, and the cutter 66.

Referring to FIG. 4, during operation, the router bit 68 engages the substrate 62 in response to commands issued from the controller 72 and cuts a slot 74 into the substrate. As the router 56 is performing a cutting operation, the controller issues commands causing the valve 76 to open and send pressurized gas to the pistons 22, FIG. 1, causing the pistons and thereby the nozzles 30 to move from the retracted to the extended positions. The pressurized gas travels through the nozzles 30 and is directed thereby into the slot 74 where any chips generated during the cutting operation are loosened and captured in the vacuum plenums 52, FIG. 3, as described above. Referring back to FIG. 4, when the cutter is in the working position, the cover 46 engages the substrate 62 and moves thereover during the cutting operation. Accordingly, the gasket 54 acts to evenly distribute any uneven forces on said cover resulting from asperous surfaces on the substrate. While a gasket 54 has been shown and described, other biasing means such as, but not limited, to springs and air cylinders can be substituted departing from broader aspects of the present invention.

It is to be understood that the form of the invention shown and described herein is to be taken as a preferred embodiment of the same, and that various changes in the selection of parts comprising the broadly defined means and in the arrangement of said parts may be resorted to without departing from the spirit of the invention or the scope of the following claims.

What is claimed is:

1. An apparatus for extracting chips from slots cut into a substrate, comprising:

a cutter having a cutting implement mounted therein and adapted to cut slots into said substrate;

at least one injector positioned proximate to said cutting implement and including a nozzle having a nozzle tip located proximate to and directed at said slots for selectively directing a current of gas into said slots during a cutting operation to loosen any substrate chips from said slots generated during said cutting operation;

vacuum means positioned proximate to said cutting implement for capturing said substrate chips loosened by said injection means; and pressurizing means for supplying said gas to said injection means.

2. An apparatus for extracting chips from slots cut into a substrate as defined by claim 1, wherein said injection means includes;

a body member coupled to said cutter;

at least one nozzle mounted to said body member and moveable relative thereto, between an extended position wherein said nozzle is adjacent to said cutting implement, and a retracted position wherein said nozzle is spaced away from said cutting implement; and said nozzle being in gaseous communication with said pressurizing means and having a tip directed at said slot when said nozzle is in said extended position, such that gas supplied by said pressurizing means travels through said nozzle and is injected into said slot being cut, such that said gas loosens any chips located in said slot, generated during said cutting operation.

3. An apparatus for extracting chips from slots cut into a substrate as defined by claim 2, wherein injection means further includes:

said body member comprising;
 a first upper surface, and a second lower surface approximately parallel to said first upper surface;
 at least one channel extending at least part way across said
second lower surface and in gaseous communication with said pressurizing means;

a piston slidably positioned in said channel, said nozzle being coupled to and extending outwardly form a mounting surface defined by said piston; and wherein said piston having, a pressure surface opposite to said mounting surface approximately perpendicular to said body member, and a bore extending from said pressure surface to said nozzle, such that when gas is supplied to said channel, said gas impinges on said pressure surface causing said nozzle to move from said retracted to said extended position wherein said gas moves through said bore to said nozzle.

4. An apparatus for extracting chips from slots cut into a substrate as defined by claim 3, wherein said injection means includes biasing means positioned in said channel for urging said piston and thereby said nozzle from said extended to said retracted position when said pressurizing means is deactivated.

5. An apparatus for extracting chips from slots cut into a substrate as defined by claim 3, wherein said apparatus further comprises a first cover mounted to said body member;

said vacuum means including at least one vacuum plenum defined by said first cover and said body member, said plenum being in communication with a vacuum source, such that said vacuum source draws any of said chips loosened by said nozzle through said plenum.

6. An apparatus for extracting chips from slots cut into a substrate as defined by claim 5, wherein:

said body member defines a plurality of channels extending at least part way across said second lower surface, a groove in gaseous communication with said pressurizing means and extending from said first upper surface part way through said body member, and a plurality of apertures, each extending from said groove and into one of said channels;

a second cover overlying said groove, such that said groove and said second cover coact to define a flow path for said gas, from said pressurizing means to each of said channels; and a plurality of pistons, each having a nozzle mounted thereto, each of said pistons being slidably positioned in one of said channels.

7. An apparatus for extracting chips from slots cut into a substrate as defined by claim 6, wherein said cutter is a flat-bed type router having;

a frame, a support surface attached to said frame for carrying said substrate;

a cutter carriage mounted to said frame and movable back-and-forth relative thereto in a first direction longitudinal of said support surface;

said cutter being mounted to said cutter carriage for movement back-and-forth along said cutter carriage in a second direction approximately perpendicular to said first direction;

said cutting implement being a bit defining a rotary cutting surface, mounted for rotation about a central axis to said cutter and movable relative to said substrate between a working position wherein said bit engages and cuts said substrate, and a non-working position wherein said bit is disengaged from said substrate.

a controller associated with said router for issuing commands thereto to coordinate the movement of said cutter carriage, said cutter, and said router bit.

8. An apparatus for extracting chips from slots cut into a substrate as defined by claim 7, wherein:

said body member is cylindrical and includes a central bore;

said body member being releasably mounted to said cutter such that said bit extends through said central bore.

9. An apparatus for extracting chips from slots cut into a substrate as defined by claim 8, further comprising:

a biasing means located between said first cover and said body member for urging said cover onto said substrate, such that when said bit is in said working position, said cover engages said substrate with said biasing means acting to evenly distribute any uneven forces on said cover resulting from asperous surfaces on the substrate.

10. An apparatus for extracting chips from slots cut into a substrate comprising:

a cutter having a cutting implement mounted thereon and adapted to cut slots into said substrate;

a body member coupled to said cutter;

at least one nozzle mounted to said body member movable relative thereto between an extended position wherein said nozzle is adjacent to said cutting implement and a retracted position wherein said nozzle is spaced away from said cutting implement;

pressurizing means for supplying gas to said nozzle;

said nozzle being in gaseous communication with said pressurizing means and having a tip directed at said slot when said nozzle is in said extended position such that gas supplied by said pressurizing means travels through said nozzle and is injected into said slot being cut, thereby loosening any chips embedded in said slot and generated during said cutting operation;

said body member including a first upper surface and a second lower surface approximately parallel to said first upper surface, at least one channel extending partway across said second lower surface and in gaseous communication with said pressurizing means;

a piston slidably positioned in said channel, said nozzle being coupled to and extending outwardly from a mounting surface defined by said piston, and wherein said piston has a pressure surface opposite said mounting surface approximately perpendicular to said body member and a bore extending from said pressure surface to said nozzle such that when gas is supplied to said channel said gas impinges on said pressure surface, causing said nozzle to move from said retracted to said extended position wherein said gas moves through said bore to said nozzle.

* * * * *